United States Patent
Yamamoto

(10) Patent No.: US 6,799,223 B1
(45) Date of Patent: Sep. 28, 2004

(54) NETWORK APPARATUS AND NETWORK COMMUNICATION METHOD

(75) Inventor: Takeshi Yamamoto, Kanagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/420,457

(22) Filed: Oct. 18, 1999

(30) Foreign Application Priority Data

Oct. 30, 1998 (JP) .......................................... 10-324432

(51) Int. Cl.⁷ .............................................. G06F 15/16
(52) U.S. Cl. ........................ 709/250; 709/217; 709/230
(58) Field of Search ................................ 709/230, 217, 709/219, 232, 231, 245, 246; 370/465, 468, 545, 522, 537, 538, 210, 484; 725/88

(56) References Cited

U.S. PATENT DOCUMENTS

| 5,414,455 | A | * | 5/1995 | Hooper et al. ................. 725/88 |
| 5,732,216 | A | | 3/1998 | Logan et al. |
| 5,732,217 | A | | 3/1998 | Emura |
| 6,097,733 | A | * | 8/2000 | Basu et al. .................. 370/329 |
| 6,181,711 | B1 | * | 1/2001 | Zhang et al. ................ 370/468 |
| 6,356,945 | B1 | * | 3/2002 | Shaw et al. .................. 709/231 |

FOREIGN PATENT DOCUMENTS

| EP | 0 797 342 A1 | 9/1997 |
| WO | WO 94/14273 | 6/1994 |

OTHER PUBLICATIONS

GloMop Group, "GloMop: Global Mobile Computing by Proxy", XP–002094009, Sep. 13, 1995, pp. 1–12.

* cited by examiner

Primary Examiner—Zarni Maung
(74) Attorney, Agent, or Firm—Pearne & Gordon LLP

(57) ABSTRACT

A network apparatus which enables continuous reproduction of image information without a necessity of a high performance CPU and a large capacity memory in mobile terminals, comprises: an Internet interface means 5 for establishing an interface with the Internet 1, a mobile interface means 7 for establishing an interface with a mobile network 4, a protocol processing means 6 for applying a,protocol process to information which are processed by the Internet interface means and the mobile interface means, an image information edit processing means 8 for editing image information which are extracted by the protocol processing means into image information suitable for a mobile communication, a storage unit 10 for storing the image information which are edited by the image information edit processing means, and a storage unit controlling means 9 for controlling to store/read the image information into/from the storage unit.

26 Claims, 13 Drawing Sheets

NETWORK APPARATUS AND NETWORK COMMUNICATION METHOD

BACKGROUND OF THE INVENTION

The present invention relates to a network apparatus which can deal with information such as image information by mobile terminals, process and store the information, and reproduce continuously the information.

In the prior art, in order to reproduce continuously moving picture information of the Internet by a terminal, compressed information is transferred to a memory of the terminal and then transferred information is expanded on the memory of the terminal to reproduce the moving picture there since the Internet does not allow real-time communication. In the event that the moving picture information is transferred piece by piece, the image information is reproduced according to such a method that, when reproduction of the image information is completed up to the transferred image portion, the succeeding image information is received sequentially and then reproduced. Therefore, it has been impossible to achieve continuous reproduction of the image information while the image information is being received.

In addition, the screens of the image information vary in size for each different content. Therefore, the size of the screens of the terminal has been taken into account.

However, in the image information transmission system in the prior art, there has been the problem that the continuous reproduction of the image information cannot be achieved as described above. Furthermore, in order to reproduce the moving picture information for a long time by the mobile terminal, there has been another problem that a high performance CPU and a large capacity memory must be prepared to execute the image processing at a high speed.

SUMMARY OF THE INVENTION

The present invention has been made to overcome the above problems in the prior art, and it is an object of the present invention to provide a network apparatus which is capable of achieving continuous reproduction of the image information by processing the information being supplied from the Internet or the mobile network into the information which is suitable for the mobile terminal, then storing processed information into the storage unit, and then transmitting the image information every unit time to continue the reading timing, without a high performance CPU and a large capacity memory in a mobile terminal.

The present invention can overcome the above problems as described in the following.

1. In order to overcome the above problems, the present invention provides a network apparatus for communicating multi-media information by mobile terminals, comprising an Internet interface means for establishing an interface with the Internet; a mobile interface means for establishing an interface with a mobile network; a protocol processing means for applying a protocol process to information which is processed by the Internet interface means and the mobile interface means; an image information edit processing means for editing image information which is extracted by the protocol processing means into image information suitable for a mobile communication; a storage unit for storing the image information which is edited by the image information edit processing means; and a storage unit controlling means for controlling to store the image information in the storage unit and to read the stored image information.

2. In order to overcome the above problems, in the present invention, the image information which is transmitted/received in respective interfaces of the Internet interface means, the mobile interface means, the protocol processing means, the image information edit processing means, and the storage unit controlling means is communicated in a cellulated format.

3. In order to overcome the above problems, in the present invention, the mobile interface means includes a mobile protocol reception processing means for receiving information from the mobile network and then informing the protocol processing means, a mobile protocol transmission processing means for transmitting information from the protocol processing means and information from the storage unit controlling means to the mobile network via a transmission process, and a transmission timing control processing means for informing the storage unit controlling means of a transmission timing so as to transmit the image information continuously every unit time, whereby continuous reproduction of the image information for the mobile network can be achieved.

4. In order to overcome the above problems, in the present invention, the Internet interface means includes an Internet protocol reception processing means for performing a communication process of the information received from the Internet and then informing the protocol processing means, and an Internet protocol transmission processing means for transmitting the information received from the protocol processing means to the Internet, and also includes an interface for cellulating the information to communicate communication information and the image information when the Internet protocol reception processing means and the Internet protocol transmission processing means communicate with the protocol processing means.

5. In order to overcome the above problems, in the present invention, the protocol processing means includes an Internet protocol address analysis processing means for determining that the information from the Internet interface means corresponds to either communication information or the image information, an image information protocol processing means for executing a protocol process of the image information from the Internet protocol address analysis processing means, a data reproduction processing means for processing the image information which is protocol-processed by the image information protocol processing means to reproduce original information, and a communication network protocol processing means for protocol-processing the information supplied to the Internet and the mobile network. The image information protocol processing means has a communication processing function for executing the communication to transmit/receive the image information to/from the mobile network and a communication processing function for fetching the image information from the Internet. The data reproduction processing means has a function for expanding compressed image information and a function for processing image information of a still picture and a moving picture. The image information protocol processing means has a communication processing function for communicating the image information in the form of a split communication in the communication with the content server in which the image information of the Internet is stored.

6. In order to overcome the above problems, in the present invention, the image information edit processing means includes a reproduced data storage unit for storing the image information reproduced by the protocol processing means, a received data managing means for managing writing/ reading of reproduced data into/from the reproduced data storage unit, and a reproduced data editing means for editing the reproduced data read from the reproduced data storage unit into a format which is suitable for the mobile terminal.

7. In order to overcome the above problems, in the present invention, the reproduced data editing means has a function for editing the image information according to type of the mobile terminal which executes the communication via the mobile network, a function for editing a size of the image into a format suitable for the mobile terminal by thinning the information from the reproduced data, and a function for editing the image information into the format suitable for the mobile terminal by converting the color information of the reproduced data into mono-chrome information.

8. In order to overcome the above problems, in the present invention, the storage unit controlling means includes an edit data split processing means for splitting edited information edited by the image information edit processing means into cellulated information to write it into the storage unit, a storage unit managing means for managing reading process/writing process from/into the storage unit, a data storage processing means for instructing the storage unit managing means on writing of split data edited by the edit data split processing means, and a data read processing means for instructing the storage unit managing means on reading in response to a reading timing instruction issued from the mobile interface means.

9. In order to overcome the above problems, in the present invention, the edit data split processing means includes an image information buffer for storing edited data from the image information edit processing means, and an information cellulating means for cellulating the edited data stored in the image information buffer.

The present invention can be constructed as set forth in the above points 1 to 9, especially to protocol-process the information from the Internet or the mobile network, extract the image information from the information being protocol-processed, then edit the extracted image information to meet with the mobile communication, then store the edited image information in the storage unit, and then transmit the timing instruction to read the stored edited information continuously every unit time so as to allow the continuous reproduction of the image information. Therefore, the image information can be continuously reproduced in the mobile network.

10. In order to overcome the above problems, in the present invention, the mobile protocol reception processing means includes a reception buffer for storing the information from the mobile network, and an information cellulating means for cellulating the information stored in the reception buffer. The mobile protocol reception processing means cellulates the information in answer to the rates of a plurality of interfaces according to the reception buffer.

The present invention can be constructed as set forth in the above 10, especially to process the image information in the interface located between the processing means by converting them into the cell format such as asynchronous transfer mode (ATM). Therefore, it is possible to achieve a higher speed transmission in processing the information and a large capacity of switching capability, both of which are required to deal with a large quantity of image information, such as with the network apparatus, and to communicate the image information between a large number of mobile terminals.

11. In order to overcome the above problems, in the present invention, the mobile protocol transmission processing means includes an asynchronous information processing means for processing asynchronous communication information from the protocol processing means, a synchronous information processing means for processing synchronous image information from the storage unit controlling means, a transmission buffer for transmitting the information to the mobile network, and an information write controlling means for controlling writing the image information from the synchronous information processing means into the transmission buffer prior to communication information being transmitted from the asynchronous information processing means. Also, the mobile protocol transmission processing means has a function for processing the communication to correspond to rates of a plurality of interfaces.

The present invention can be constructed as set forth in the above point number 11, especially to distinguish the communication information into the image information necessary for the continuous reproduction of the moving picture information and the communication information, then to handle the image information as the preferential information and the communication information as the non-preferential information so as to achieve the continuous reproduction of the image information, then to transmit the non-preferential information between transmissions of preferential information, whereby the preferential information can be transmitted preferentially to the mobile network. Therefore, there can be achieved the network apparatus and the network communication method which can accomplish the continuous reproduction of the image information.

12. In order to overcome the above problems, in the present invention, a network apparatus comprises a mobile interface means for establishing an interface with a mobile network in communication with the mobile network; a protocol processing means for processing protocol of information supplied from the mobile terminal and processed by the mobile interface means; a storage unit for storing image information; and a storage unit controlling means for controlling to read image information stored in the storage unit; wherein the image information read from the storage unit is supplied constantly to the mobile network to deliver broadcast.

The present invention can be constructed as set forth in the above point number 12, especially to read the information being stored in the storage unit in compliance with the reading timing instructed by the mobile interface means. Therefore, there can be achieved the network apparatus and the network communication method which can provide a broadcasting function by which the information can always be kept to send to the mobile network.

13. In order to overcome the above problems, in the present invention, a network apparatus comprises a mobile interface means for establishing an interface with a mobile network for communication with the mobile network; a protocol processing means for processing protocol of image information from the mobile terminal; an image information edit processing means for editing the image information into edited information suitable for the mobile terminal; a storage unit for storing the edited information; and a storage unit controlling means for controlling storing the edited information into the storage unit and reading stored edited information; wherein the image information is communicated between the mobile terminals.

The present invention can be constructed as set forth in the above point number 13, especially to edit the image information, which is supplied from the mobile terminal, into the edited information, which is suitable for the different types of mobile terminals, by the image information edit processing means, then to store the edited information in the storage unit, and then to transmit the edited information to other mobile terminals, such as when the image information is communicated from the Internet. Therefore, there can be achieved the network apparatus and the network communication method which can implement the communication of the image information between the mobile terminals.

14. In order to overcome the above problems, in the present invention, a network apparatus comprises a mobile interface means for establishing an interface with a mobile network for communication with the mobile network; a protocol processing means for processing protocol of image information from the mobile terminal; an image information conversion processing means for converting the image information into a common image information format; a storage unit for storing converted image information; a storage unit controlling means for controlling storing the image information into the storage unit and reading stored image information; and an image information custom processing means for editing the image information read from the storage unit into the image information which is suitable for respective mobile terminals; wherein the image information can be communicated between different types of mobile terminals.

The present invention can be constructed as set forth in the above point number 14, especially to convert the image information into the image information in the common image information format, then to store it in the storage unit, and then to convert the stored image information in the common image information format into the image information in each format for each respective terminal when the image information is transmitted to the mobile network. Therefore, there can be achieved the network apparatus and the network communication method in which the image information being stored once can be utilized again because it is not affected by the image information format in the network and thus they can be achieved as the communicating function between the mobile terminals and the broadcasting function.

15. In order to overcome the above problems, in the present invention, a network apparatus comprises a mobile interface means for establishing an interface with a mobile network in communication with the mobile network; a protocol processing means for processing protocol of image information from the mobile terminal; a storage unit for storing the image information in a common image information format; a storage unit controlling means for controlling storing the image information into the storage unit and reading stored image information; and an image information custom processing means for editing the image information read from the storage unit into the image information which is suitable for respective mobile terminals.

The present invention can be constructed as set forth in the above point number 15, especially to convert the image information in the common image information format from the storage unit into the image information in each format handled by each terminal by the image information custom processing means when the image information is transmitted to the mobile network. Therefore, there can be achieved the network apparatus and the network communication method which can achieve the broadcasting function.

16. In order to overcome the above problems, in the present invention, a network apparatus for communicating multi-media information by mobile terminals, comprises an Internet interface means for establishing an interface with the Internet; a mobile interface means for establishing an interface with a mobile network; a protocol processing means for processing protocol of information which is processed by the Internet interface means and the mobile interface means; an image information conversion processing means for converting the image information extracted by the protocol processing means into a common image information format; a storage unit for storing the image information converted by the image information conversion processing means; a storage unit controlling means for controlling storing the image information into the storage unit and reading stored image information; and an image information custom processing means for editing and processing the image information read by the storage unit controlling means to perform a mobile communication.

The present invention can be constructed as set forth in the above point number 16 and especially there can be provided the network apparatus and the network communication method, which can reuse the image information being stored once in the storage unit by converting the image information into the common image information format by the image information conversion processing means and then storing the converted image information in the storage unit since the image information is not affected by the image information format in the network, and also can achieve the communicating function between the mobile terminals and the broadcasting function by converting the image information stored in the storage unit in the common image information format into the image information in the formats being handled by respective terminals by the image information custom processing means when the image information is transmitted to the mobile network, and also can achieve continuous reproduction of the image information for the mobile network since the mobile interface means can inform the storage unit controlling means of the reading timing instruction for the stored edited information continuously every unit time to allow the continuous reproduction of the image information.

DETAILED DESCRIPTION OF THE PREFERRED EMBODIMENTS

Embodiments of the present invention will be explained in detail with reference to the accompanying drawings FIG. 1 to FIG. 13 hereinafter.

(Embodiment 1)

Figure 1:
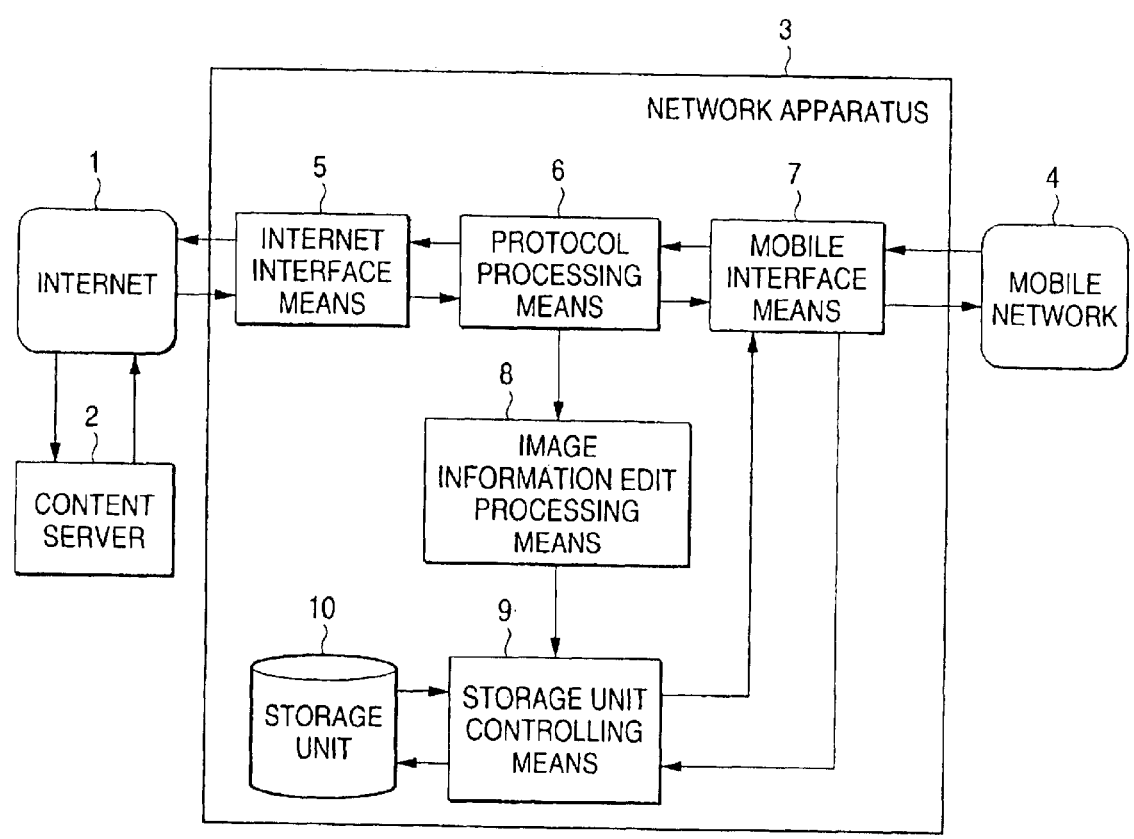
FIG. 1 is a block diagram showing a network apparatus according to an embodiment 1 of the present invention.

First, a network apparatus 3 according to an embodiment 1 of the present invention, which can achieve the continuous reproduction of the image information to a mobile network, will be explained with reference to FIG. 1 hereinafter. Here a plurality of mobile networks may be employed. FIG. 1 is a block diagram showing the network apparatus 3 in the embodiment 1 of the present invention.

In FIG. 1, a reference 1 denotes the Internet; 2, a content server for providing moving pictures or still pictures as contents; 3, a network apparatus, which establishes an interface between the Internet 1 and a mobile network 4; 4, a mobile network; 5, an Internet interface means, which establishes an interface between the network apparatus 3 and the Internet 1; 6, a protocol processing means, which executes the protocol process of the information supplied from the Internet 1 and the mobile network 4; 7, a mobile interface means, which establishes an interface between the network apparatus 3 and the mobile network 4; 8, an image information edit processing means, which edits the image information, which is transmitted from the Internet 1 and the mobile network 4, into the image information which is suitable for the mobile terminal; 9, a storage unit controlling means, which controls the writing/reading of the image information into/from a storage unit 10; and 10, a storage unit.

Next, an operation of the network apparatus 3 constructed as described above in the embodiment 1 of the present invention will be explained with reference to FIG. 1 hereinafter.

A feature of the network apparatus 3 in the embodiment 1 is that the image information for the mobile network 4 can be reproduced continuously.

A message issued from the mobile network 4 to request the image information is processed by the network apparatus 3 and then supplied to the content server 2. More particularly, the information which is interfaced by the mobile interface means 7 is protocol-processed by the protocol processing means 6, and then the message is supplied from the Internet interface means 5 to the content server 2 via the Internet 1. When the image information is supplied from the content server 2 to the Internet interface means 5 via the Internet 1 in response to the message, the image information is extracted by the protocol processing means 6 and then edited suitably for the mobile terminal by the image information edit processing means 8.

The storage unit controlling means 9 loads the edited image information into the storage unit 10. When the protocol processing means 6 determines that the transmission of the image information from the content server 2 has been completed, such protocol processing means 6 informs the mobile interface means 7 of such completion, and then starts the communication with the mobile network 4 to achieve the continuous reproduction of the image information. More specifically, the mobile interface means 7 instructs a reading timing at which units of the image information can be transmitted successively to the storage unit controlling means 9 every unit time. The storage unit controlling means 9 transfers the edited image information from the storage unit 10 to the mobile interface means 7 in answer to the instructed timing. The mobile interface means 7 transfers the image information, which has been transferred from the storage unit controlling means 9, to the mobile network 4 so as to allow the continuous reproduction.

Figure 2:
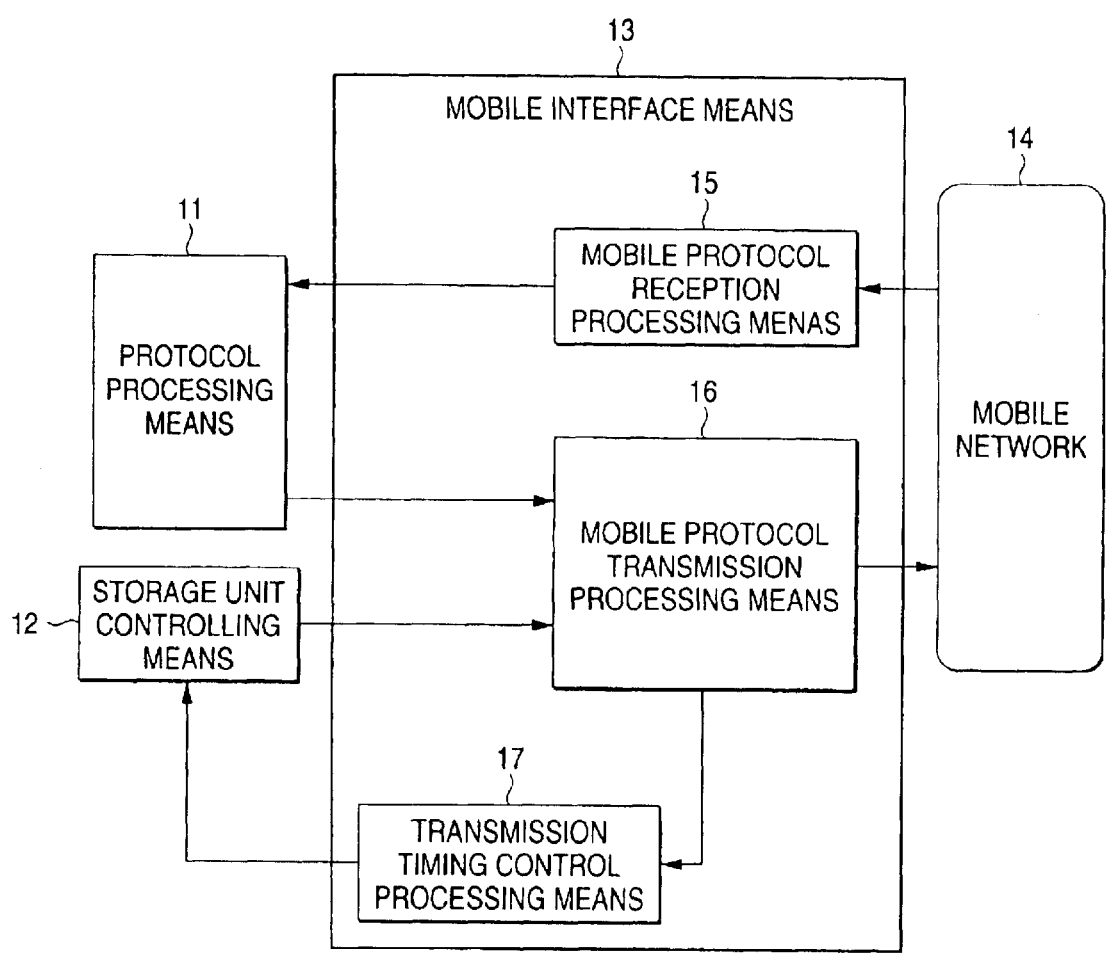
FIG. 2 is a block diagram showing a mobile interface means in the embodiment 1 of the present invention.

Next, the mobile interface means 13 of the network apparatus, which executes the communication with the mobile network for the continuous reproduction of the image information, in the embodiment 1 of the present invention will be explained with reference to FIG. 2 hereinafter. FIG. 2 is a block diagram showing the mobile interface means 13 in the embodiment 1 of the present invention.

In FIG. 2, a reference 11 denotes a protocol processing means; 12, a storage unit controlling means; 13, a mobile interface means; and 14, a mobile network. The mobile interface means 13 establishes an interface with the mobile network 14, and employs its processed result in the communication with the protocol processing means 11. A reference 15 denotes a mobile protocol reception processing means, which handles the reception process for receiving the information from the mobile network 14 and then informs the protocol processing means 11 of the result of the reception process. A reference 16 denotes a mobile protocol transmission processing means, which executes the transmission process for transmitting both the communication information supplied from the protocol processing means 11 and the image information supplied from the storage unit controlling means 12 to the mobile network 14. A reference 17 denotes a transmission timing control processing means 17, which instructs the storage unit controlling means 12 of a transmission timing for the image information to be transmitted such that units of the image information can be transmitted successively from the mobile protocol transmission processing means 16 every unit time.

Next, an operation of the mobile interface means 13 constructed as described above in the embodiment 1 of the present invention will be explained with reference to FIG. 2 hereinafter. When the reception is affected, from the mobile network 14 to the mobile interface means 13, such reception is processed by the mobile protocol reception processing means 15 to inform the protocol processing means 11 of such reception. In contrast, when the transmission is affected from the protocol processing means 11, such transmission is informed and processed by the mobile protocol transmission processing means 16 and then transmitted to the mobile network 14.

In order to achieve the continuous reproduction of the image information in the mobile network 14, the mobile protocol transmission processing means 16 controls the transmission of the image information. In order not to disconnect the image information transmitted every unit time, the transmission timing control processing means 17 instructs the storage unit controlling means 12 of the reading timing for the image information. The storage unit controlling means 12 transmits the image information to the mobile protocol transmission processing means 16 in synchronous with the reading timing. The mobile protocol transmission processing means 16 transmits the image information to the mobile network 14 so as to allow the continuous reproduction communication of the image information.

Figure 3:
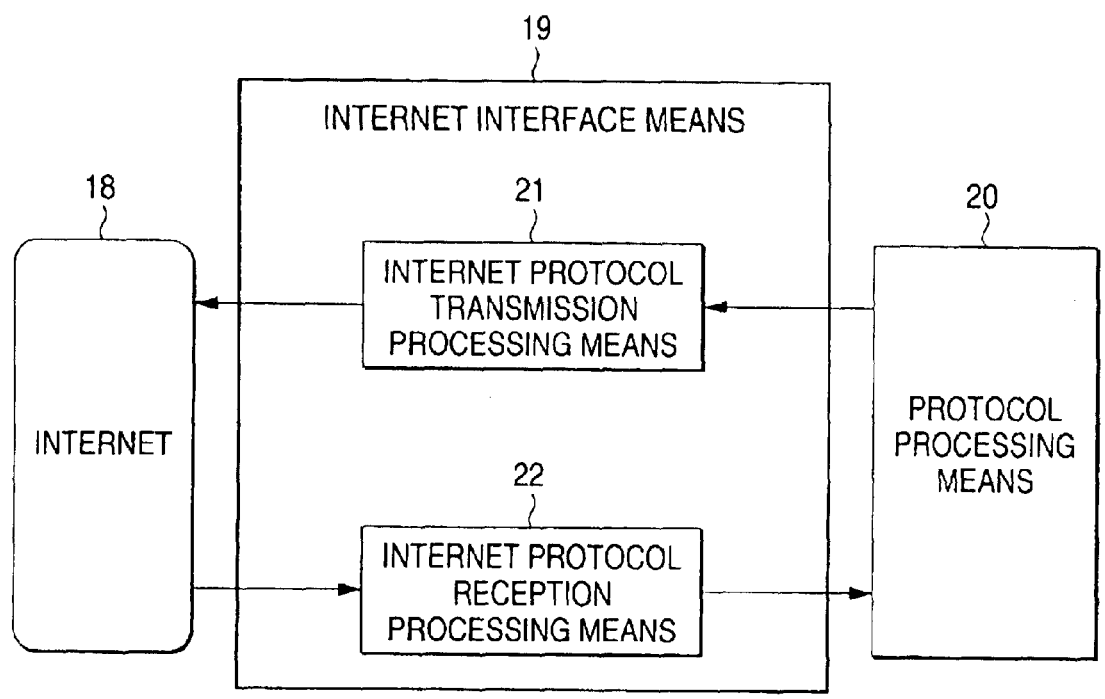
FIG. 3 is a block diagram showing an Internet interface means in the embodiment 1 of the present invention.

Next, an Internet interface means 19 of the network apparatus, which effects the communication with the Internet, in the embodiment 1 of the present invention will be explained with reference to FIG. 3 hereinafter. FIG. 3 is a block diagram showing the Internet interface means 19 in the embodiment 1 of the present invention.

In FIG. 3, a reference 18 denotes the Internet; 19, the Internet interface means; 20, a protocol processing means; 21, an Internet protocol transmission processing means; and 22, an Internet protocol reception processing means. The Internet interface means 19 establishes an interface with the Internet 18 to employ the information in the communication with the protocol processing means 20. The Internet protocol transmission processing means 21 executes the process for transmitting the information being transmitted from the protocol processing means 20 to the Internet 18. The Internet protocol reception processing means 22 executes the process for receiving the information from the Internet 18 and then informs the protocol processing means 20 of the received information.

Then, an operation of the Internet interface means 19 constructed as described above in the embodiment 1 of the present invention will be explained with reference to FIG. 3 hereinafter.

When the transmission is started from the protocol processing means 20, the Internet protocol transmission processing means 21 is informed of such transmission and executes the transmission process, and then the information is transmitted to the Internet 18. In contrast, when the reception from the Internet 18 to the Internet interface means 19 is generated, the Internet protocol reception processing means 22 executes the reception process and then informs the protocol processing means 20 of the received information.

Figure 4:
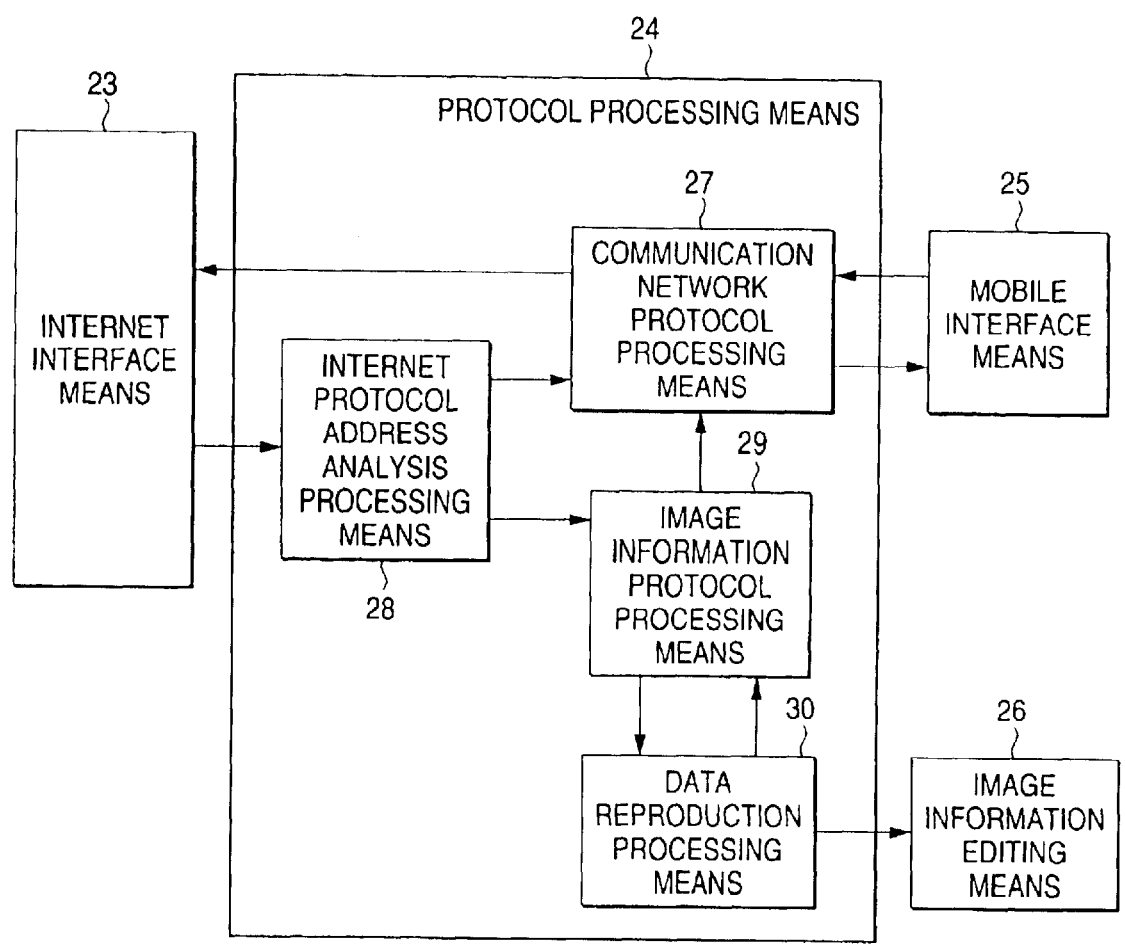
FIG. 4 is a block diagram showing a protocol processing means in the embodiment 1 of the present invention.

In turn, a protocol processing means 24 of the network apparatus, which executes the protocol process for the information supplied from the Internet and the mobile network, in the embodiment 1 of the present invention will be explained with reference to FIG. 4 hereinafter. FIG. 4 is a block diagram showing the protocol processing means 24 in the embodiment 1 of the present invention.

In FIG. 4, a reference 23 denotes an Internet interface means; 24, a protocol processing means; 25, a mobile interface means; and 26, an image information editing means. The protocol processing means 24 executes the protocol process for the information supplied from the Internet interface means 23 and the 25 mobile interface means 25, and extracts the image information from the received information and then transmits the image information to the image information editing means 26. In addition, a reference 27 denotes a communication network protocol processing means, which executes the protocol process for the information being transmitted/received by the Internet interface means 23 and the mobile interface means 25; 28, an Internet protocol address analysis processing means, which analyzes the address of the information received from the Internet interface means 23 and then analyzes that the information correspond to either of the communication information and the image information for the mobile network; 29, an image information protocol processing means, which processes the protocol for the image information; and 30, a data reproduction processing means, which reproduces the original information from the image information which has been subjected to the protocol process.

Next, an operation of the protocol processing means 24 constructed as described above in the embodiment 1 of the present invention will be explained with reference to FIG. 4 hereinafter.

When the information is received from the mobile interface means 25, the protocol process is carried out by the communication network protocol processing means 27. Depending upon the state of the protocol process, the communication network protocol processing means 27 returns the response to the mobile interface means 25 or transmits the information to the Internet interface means 23.

When the image information is received from the Internet interface means 23, the Internet protocol address analysis processing means 28 analyzes that the information correspond to either of the communication information and the image information for the mobile network. In the case of the image information, such image information is extracted by the protocol process conducted by the image information protocol processing means 29. The original image information is reproduced from the extracted image information by the data reproduction processing means 30. In this case, according to the communication protocol for the image information, the information is transmitted in various formats such as compressed information, split-transmitted information, the moving picture information, the still picture information, or the like, nevertheless all information can be reproduced by the data reproduction processing means 30. The reproduced information is transferred to the image information editing means 26.

If the information is analyzed as the communication information by the Internet protocol address analysis processing means 28, the Internet protocol address analysis processing means 28 informs the communication network protocol processing means 27 of the information and then communicates with the mobile interface means 25.

Figure 5:
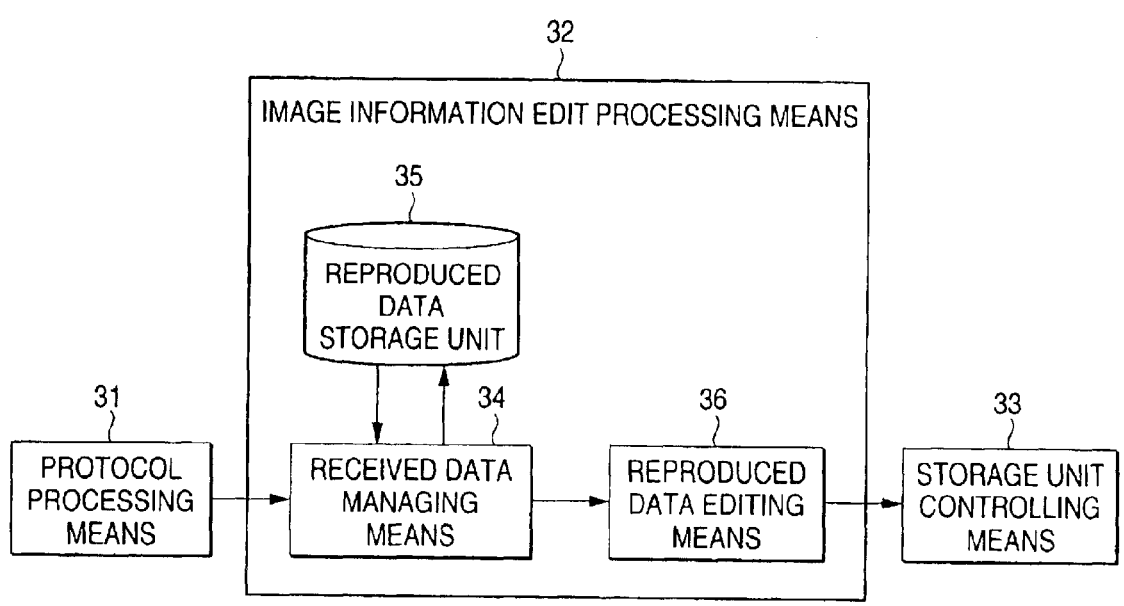
FIG. 5 is a block diagram showing an image information edit processing means in the embodiment 1 of the present invention.

Next, an image information edit processing means 32 of the network apparatus, which performs the process of editing the received image information into the image information suitable for the mobile communication, in the embodiment 1 of the present invention will be explained with reference to FIG. 5 hereinafter. FIG. 5 is a block diagram showing the image information edit processing means 32 in the embodiment 1 of the present invention.

In FIG. 5, a reference 31 denotes a protocol processing means; 32, an image information edit processing means; and 33, a storage unit controlling means. The image information edit processing means 32 edits the image information extracted by the protocol processing means 31 into the information which is suited to the mobile terminal and then transfers such information to the storage unit controlling means 33. In addition, a reference 34 denotes a received data managing means, which carries out the processes for writing/reading the image information supplied from the protocol processing means 31 into/from a reproduced data storage unit 35. A reference 35 denotes a reproduced data storage unit, which stores the image information received from the protocol processing means 31. A reference 36 denotes a reproduced data editing means, which edits the image information stored in the reproduced data storage unit 35 into the information which is suited to the mobile terminal.

Next, an operation of the image information edit processing means 32 constructed as described above in the embodiment 1 of the present invention will be explained with reference to FIG. 5 hereinafter.

When the image information is received from the protocol processing means 31, the received data managing means 34 writes such image information into the reproduced data storage unit 35. When loading of the image information is completed, the reproduced data editing means 36 instructs the received data managing means 34 to read the reproduced data from the reproduced data storage unit 35 and then edits the reproduced data. The edited data is then transferred to the storage unit controlling means 33. In order to edit the reproduced data into the information which is suited to the mobile terminal, the reproduced data editing means 36 performs various processes. e. g. corrects a size of the image, corrects the reproduced data into mono-chrome data, thins the information, etc. It is possible to execute these processes according to the type of the terminal.

Figure 6:
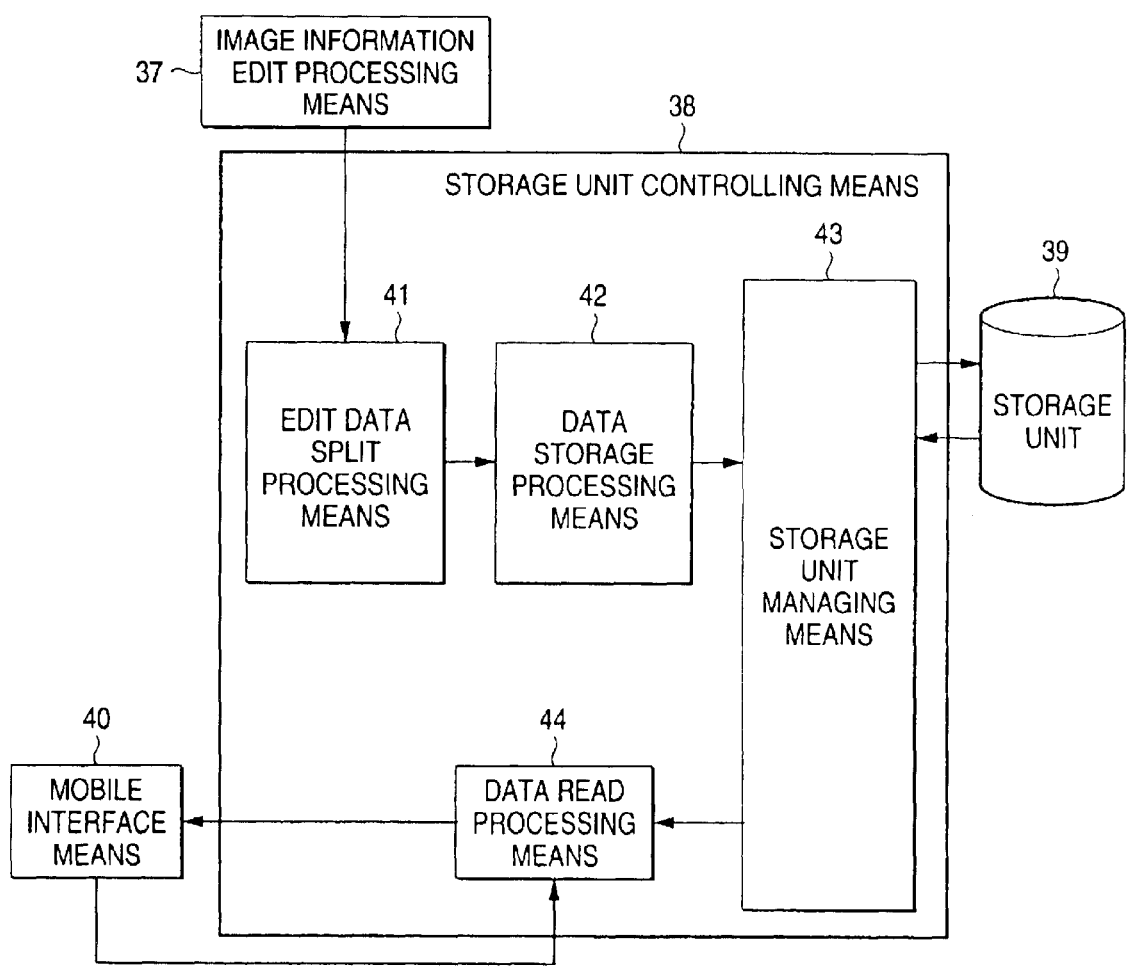
FIG. 6 is a block diagram showing a storage unit controlling means in the embodiment 1 of the present invention.

Next, a storage unit controlling means 38 of the network apparatus, which manages reading/writing of the image information from/into the storage unit, in the embodiment 1 of the present invention will be explained with reference to FIG. 6 hereinafter. FIG. 6 is a block diagram showing the storage unit controlling means 38 in the embodiment 1 of the present invention.

In FIG. 6, a reference 37 denotes an image information edit processing means; 38, a storage unit controlling means; 39, a storage unit; and 40, a mobile interface means. The storage unit controlling means 38 writes the image information supplied from the image information edit processing means 37 into the storage unit 39, and reads the information from the storage unit 39 in accordance with the reading timing instruction from the mobile interface means 40, and transfers the information to the mobile interface means 40.

In addition, a reference 41 denotes an edit data split processing means, which splits the image information received from the image information edit processing means 37 so as to make the reading of the storage unit 39 easy in achieving the continuous reproduction communication; 42, a data storage processing means, which controls the writing into the storage unit 39; 43, a storage unit managing means, which performs the writing/reading of the data into/from the storage unit 39; and 44, a data read processing means, which controls the reading of the storage unit managing means 43.

Next, an operation of the storage unit controlling means 38 constructed as described above in the embodiment 1 of the present invention will be explained with reference to FIG. 6 hereinafter.

When the edited data is received from the image information edit processing means 37, the edit data split processing means 41 splits the edited data such that easy formats can be applied to the file managing method of the storage unit 39 and the continuous reproduction communication of the image information. As an example of the data format, there is an ATM cell which can assure the real-time processing at a high speed. The data storage processing means 42 executes the management to store the split and edited data into the storage unit 39. If the storage unit 39 consists of a distributed hard disk, data loading must be managed so as to manage the files by the distributed management method.

The storage unit managing means 43 writes the data into the storage unit 39 in compliance with the instruction issued from the data storage processing means 42. When the mobile interface means 40 instructs the data read processing means 44 to read the data, the data read processing means 44 instructs the storage unit managing means 43 to read the data from the storage unit 39. The read data is transferred to the mobile interface means 40.

Figure 7:
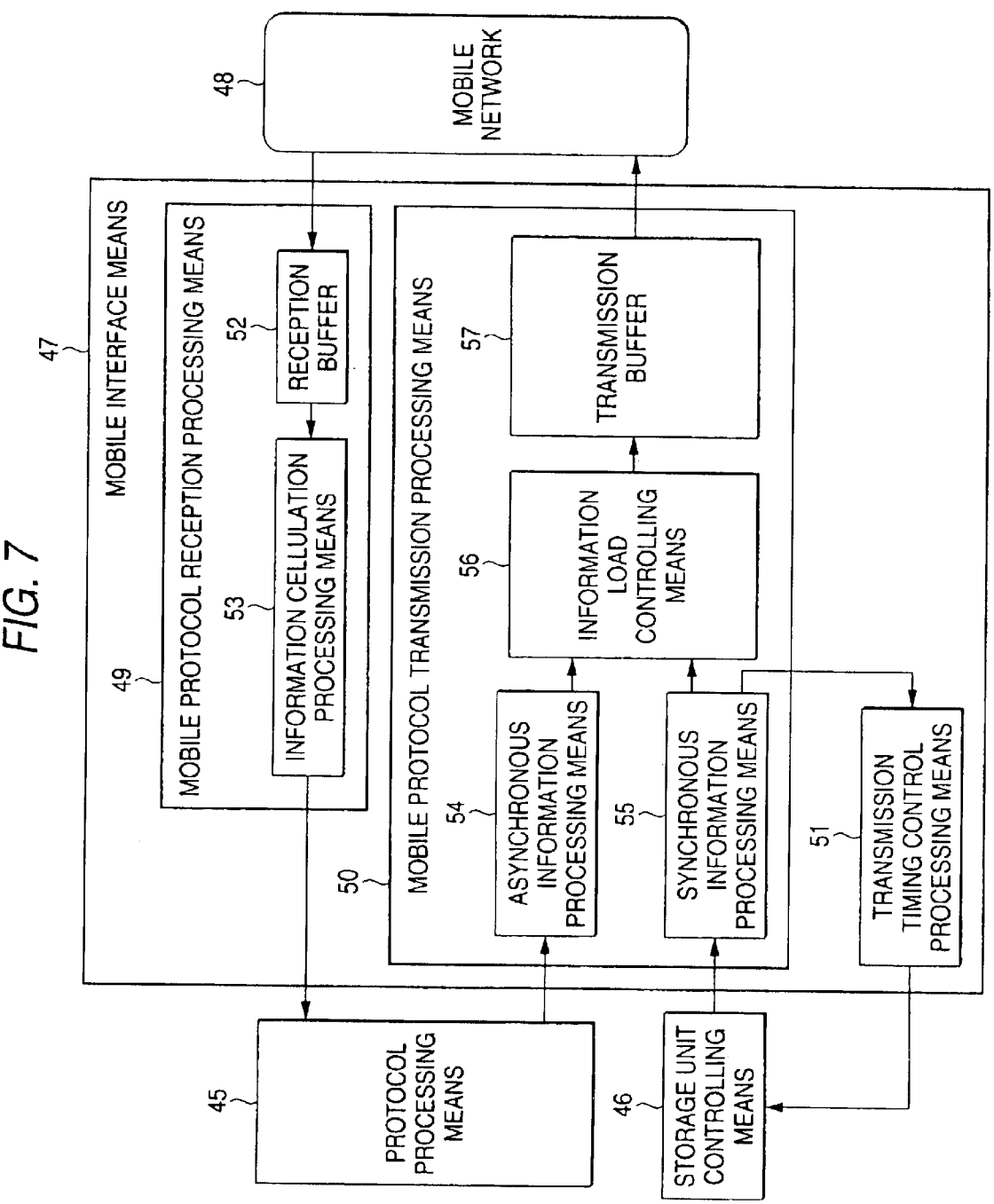
FIG. 7 is a block diagram showing a mobile interface means in the embodiment 1 of the present invention.

Next, a mobile interface means 41 of the network apparatus, which conducts the continuous reproduction communication of the image information with the mobile network 48, in the embodiment 1 of the present invention will be explained with reference to FIG. 7 hereinafter. FIG. 7 is a block diagram showing the mobile interface means 41 in the embodiment 1 of the present invention.

In FIG. 7, a reference 45 denotes a protocol processing means; 46, a storage unit controlling means; 47, a mobile interface means; and 48, a mobile network. The mobile interface means 47 establishes an interface with the mobile network 48, and transmits/receives the process results to/from the protocol processing means 45. In addition, a reference 49 denotes a mobile protocol reception processing means, which executes the reception process from the mobile network 48 and then informs the protocol processing means 45 of the result of the reception process; 50, a mobile protocol transmission processing means, which effects the process for transmitting the transmission information supplied from the protocol processing means 45 and the image information supplied from the storage unit controlling means 46 to the mobile network 48; and 51, a transmission timing control processing means, which instructs the storage unit controlling means 46 of the transfer timing of the transmitted image information, in order to accomplish the continuous reproduction communication of the image information in the mobile protocol transmission processing means 50.

Then, in the mobile protocol reception processing means 49, a reference 52 denotes a reception buffer, which buffers the received information supplied from the mobile network 48; and 53, an information cellulation processing means, which executes the process for ATM-cellulating the information received from the reception buffer 52. Further, in the mobile protocol transmission processing means 50, a reference 54 denotes an asynchronous information processing means, which carries out the reception process of the communication information; 55, a synchronous information processing means, which executes the reception process of the image information; 56, an information load controlling means, which performs the process for writing the information processed by the synchronous information processing means 55 prior to the information processed by the asynchronous information processing means 54; 57, a transmission buffer, which effects the transmission for the mobile network 48 in compliance with the writing sequence from the information load controlling means 56.

Next, an operation of the mobile interface means 47 constructed as described above in the embodiment 1 of the present invention will be explained with reference to FIG. 7 hereinafter.

The received information from the mobile network 48 is subjected to the reception process in the mobile protocol reception processing means 49, and then the protocol processing means 45 is informed of such reception. At that time, the information is buffered once, then is ATM-cellulated by the information cellulation processing means 53, and then is transmitted to the protocol processing means 45.

Meanwhile, the information transmitted to the mobile network 48 can be classified into the communication information supplied from the protocol processing means 45 and the image information supplied from the storage unit controlling means 46. The communication information received from the protocol processing means 45 is processed by the synchronous information processing means 55, while the image information received from the storage unit controlling means 46 is processed by the synchronous information processing means 55. Since the image information from the storage unit controlling means 46 is requested to assure the continuous reproduction communication of the image information for the mobile network 48, the information load controlling means 56 loads preferentially the image information supplied from the synchronous information processing means 55 into the transmission buffer 57.

The receiver side can reproduce the image information continuously by continuing to transfer the moving picture information in a unit time. For that purpose, the information load controlling means 56 writes the information into the transmission buffer 57 so as to allow the continuous reproduction communication of the image information, and also writes the information supplied from the asynchronous information processing means 54 into the transmission buffer 57 during that time. A timing of the image information is provided from the synchronous information processing means 55 to the transmission timing control processing means 51 such that the transmission can be controlled without need of the information to be transmitted.

Figure 8:
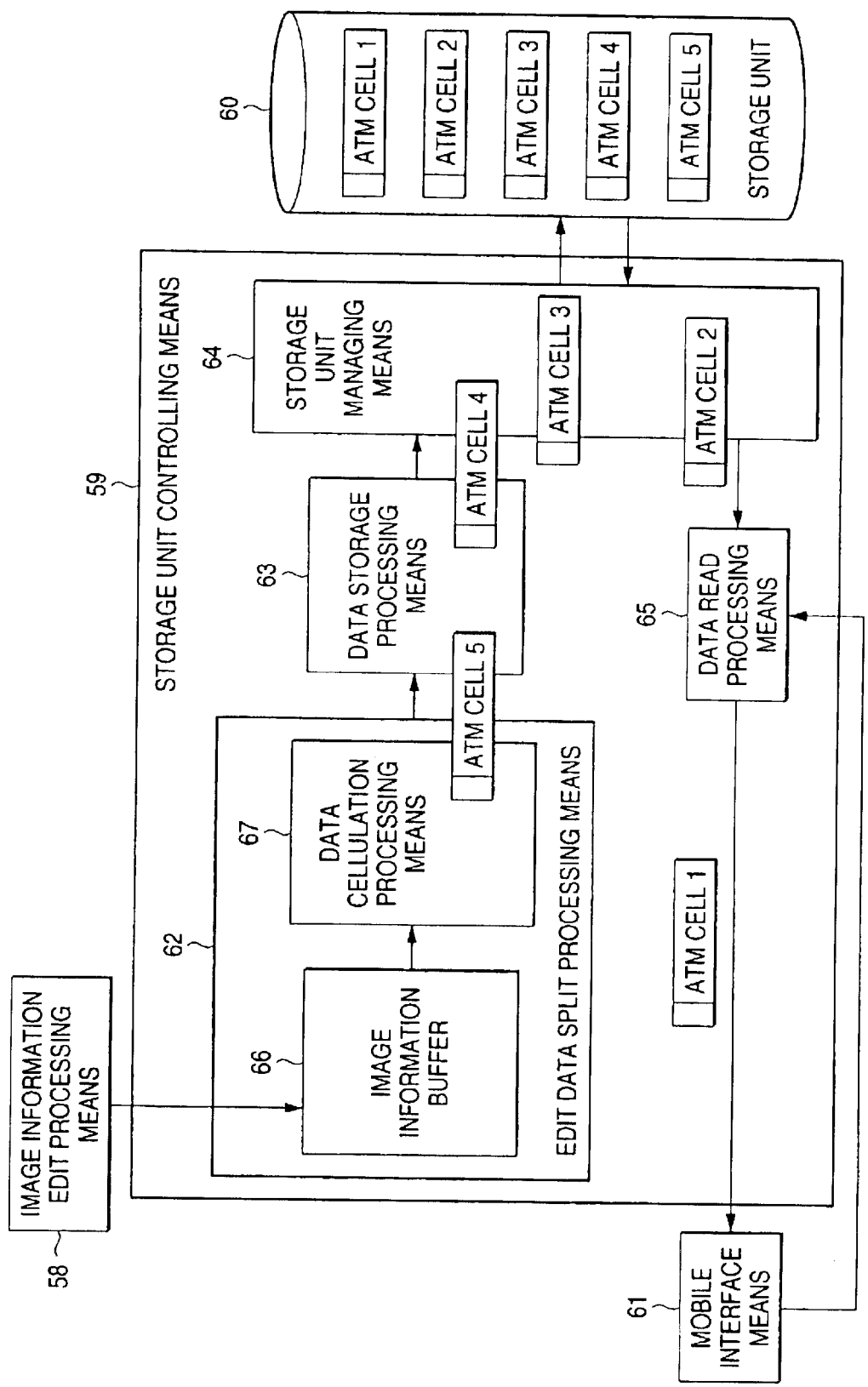
FIG. 8 is a block diagram showing a storage controlling means in the embodiment 1 of the present invention.

Next, a storage unit controlling means 59 of the network apparatus, which manages the writing/reading of the image information into/from the storage unit, in the embodiment 1 of the present invention will be explained with reference to FIG. 8 hereinafter. FIG. 8 is a block diagram showing the storage unit controlling means 59 in the embodiment 1 of the present invention.

In FIG. 8, a reference 58 denotes an image information edit processing means; 59, a storage unit controlling means; 60, a storage unit; and 61, a mobile interface means. The storage unit controlling means 59 writes the image information from the image information edit processing means 58 into the storage unit 60, and reads the image information from the storage unit 60 in response to the reading timing instruction from the mobile interface means 61, and transfers the image information to the mobile interface means 61.

Further, a reference 62 denotes an edit data split processing means, which splits the image information received from the image information edit processing means 58 so as to expedite the reading of the data from the storage unit 60 in achieving the continuous reproduction communication; 63, a data storage processing means, which controls the writing of the data into the storage unit 60; 64, a storage unit managing means, which manages the writing/reading of the data into/from the storage unit 60; and 65, a data read processing means, which manages the reading of the data from the storage unit managing means 64.

Also, in the edit data split processing means 62, a reference 66 denotes an image information buffer, which buffers the image information supplied from the image information edit processing means 58; and 67, a data cellulation processing means, which applies the ATM cellulation process to the image information supplied from the image information buffer 66.

Next, an operation of the storage unit controlling means 59 constructed as described above in the embodiment 1 of the present invention will be explained with reference to FIG. 8 hereinafter.

When the edited image information is received from the image information edit processing means 58, the edit data split processing means 62 splits the received image information into a format which is easy to execute the file management method of the storage unit 60 and the continuous reproduction of the image information. At that time, the image information is buffered once by the image information buffer 66, and then converted into the data format for the ATM cell by the data cellulation processing means 67. As for the access of the storage unit 60, the writing is managed by the data storage processing means 63 while the reading is managed by the data read processing means 65. The ATM cell format is employed as a data format to store the data in the storage unit 60, whereby the communication interface which makes it possible to process a large quantity of data at a high speed can be achieved.

(Embodiment 2)

Figure 9:
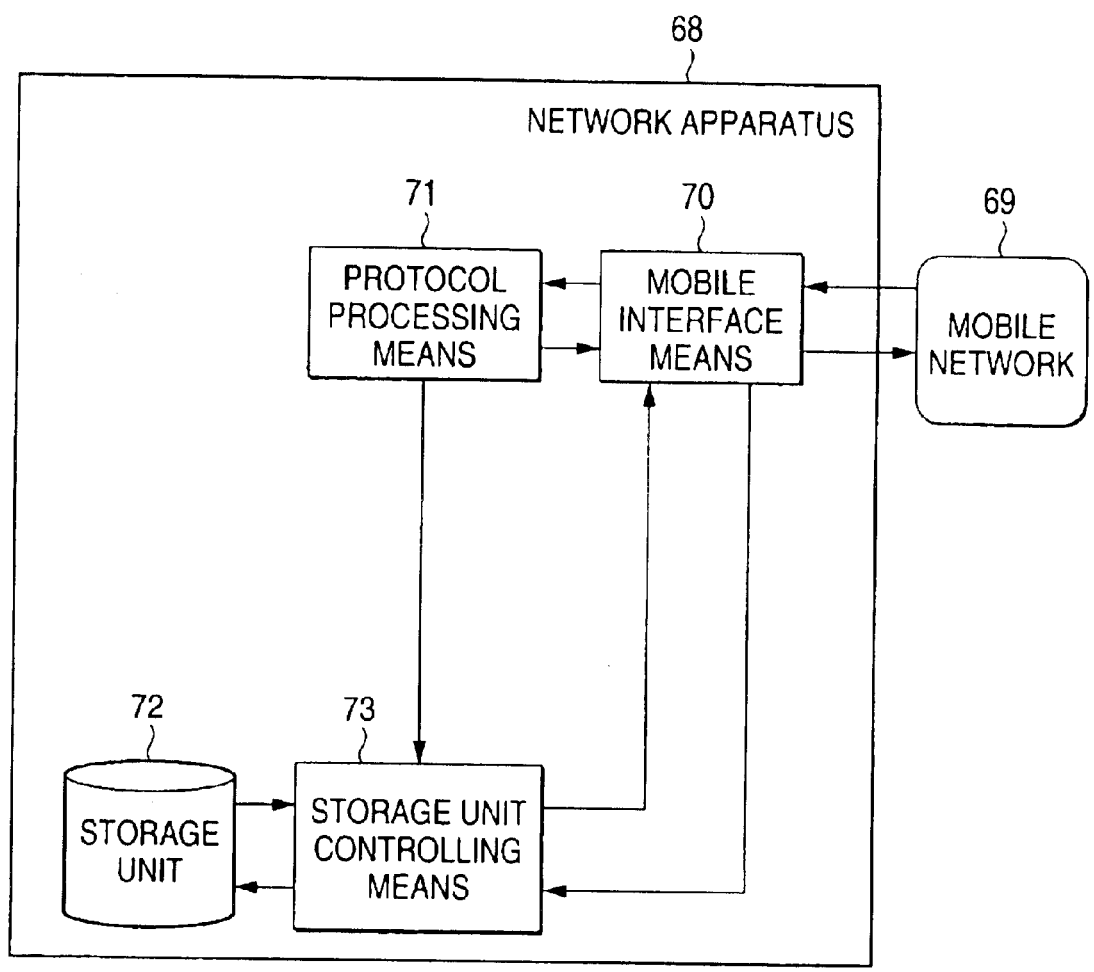
FIG. 9 is a block diagram showing a network apparatus according to an embodiment 2 of the present invention.

Next, a network apparatus 68, which accomplishes the broadcast of the continuous reproduction of the image information for the mobile network, in an embodiment 2 of the present invention will be explained with reference to FIG. 9 hereinafter. Here a plurality of mobile networks may be employed. FIG. 9 is a block diagram showing the network apparatus 68 according to the embodiment 2 of the present invention.

In FIG. 9, a reference 68 denotes a network apparatus; 69, a mobile network; 70, a mobile interface means, which establishes an interface with the mobile network 69; 71, a protocol processing means, which executes the protocol process of the information processed by the mobile interface means 70; 72, a storage unit, in which the information to be broadcasted is stored; and 73, a storage unit controlling means, which controls the writing/reading of the information into/from the storage unit 72.

Next, an operation of the network apparatus 68 constructed as described above in the embodiment 2 of the present invention will be explained with reference to FIG. 9 hereinafter.

A feature of the network apparatus 68 in the embodiment 2 is that the image information is continuously reproduced and broadcasted to the mobile network 69.

A request message issued from the mobile network 69 to request the broadcast of the image information is processed by the network apparatus 68. Then, the network apparatus 68 transmits the information to the mobile network 69. Depending upon the service content, the information can always be transmitted continuously as the broadcast without the request message.

The message issued from the mobile network 69 is subjected to the reception process by the mobile interface means 70 and then is subjected to the protocol process by the protocol processing means 71. As the result of this, the mobile interface means 70 returns the message concerning to the broadcast to the mobile network 69, and also instructs the storage unit controlling means 73 to read the broadcast information from the storage unit 72. After the broadcast has been commenced at that time, the mobile interface means 70 instructs the storage unit controlling means 73 of the timing to read the broadcast information from the storage unit 72, so that the broadcast of the continuous reproduction of the image information can be implemented.

(Embodiment 3)

Figure 10:
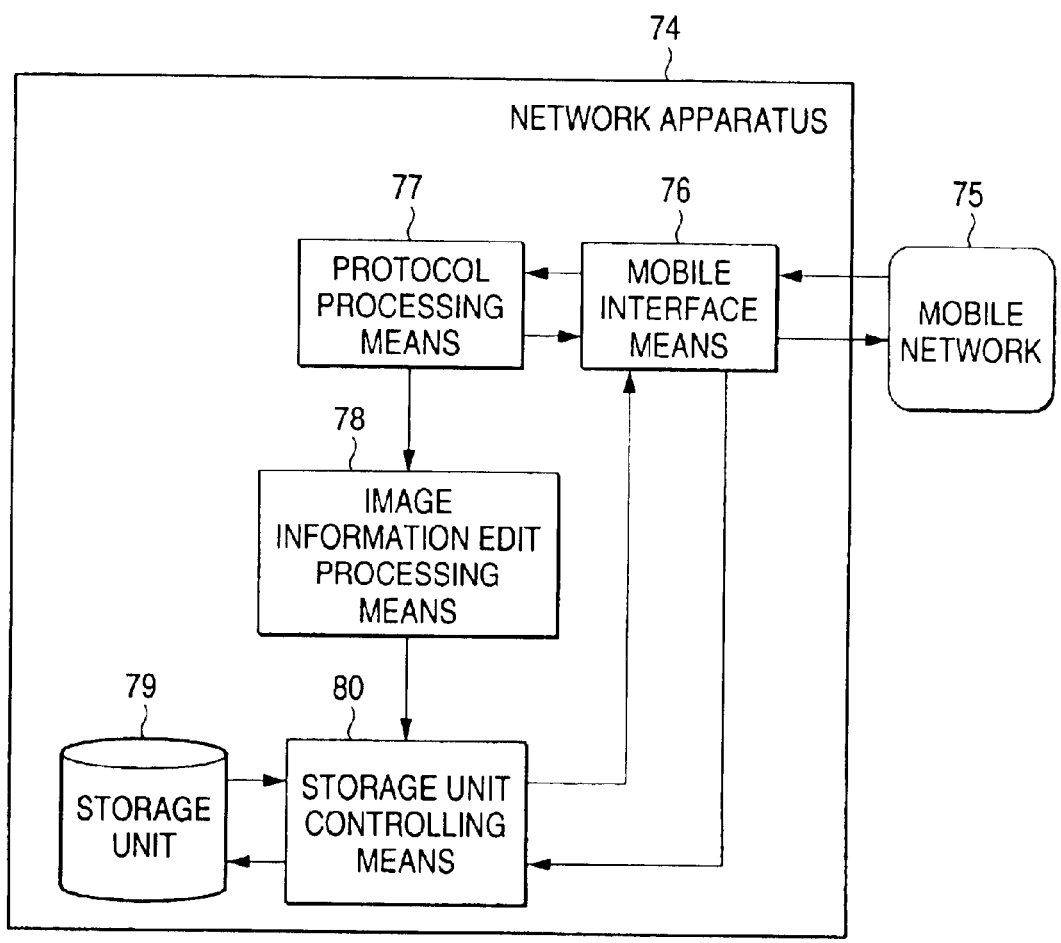
FIG. 10 is a block diagram showing a network apparatus according to an embodiment 3 of the present invention.

Next, a network apparatus 74, which accomplishes the communication of the image information between the mobile terminals in the mobile network, in an embodiment 3 of the present invention will be explained with reference to FIG. 10 hereinafter. Here a plurality of mobile networks may be employed. FIG. 10 is a block diagram showing the network apparatus 74 according to an embodiment 3 of the present invention.

In FIG. 10, a reference 74 denotes a network apparatus; 75, a mobile network; 76, a mobile interface means, which establishes an interface with the mobile network 75; 77, a protocol processing means, which executes the protocol process of the information being processed by the mobile interface means 76; and 78, an image information edit processing means, which executes the editing process according to the reading mobile terminal. In this embodiment, no editing is needed between the same terminals. In addition, a reference 79 denotes a storage unit, which stores the information supplied from the mobile terminal; and 80, a storage unit controlling means, which controls the writing/reading of the information supplied from the mobile terminal into/from the storage unit 72.

Next, an operation of the network apparatus 74 constructed as described above in the embodiment 3 of the present invention will be explained with reference to FIG. 10 hereinafter.

A feature of the network apparatus 74 in the embodiment 3 resides in that the image information used between the mobile terminals is communicated between the network apparatus 74 and the mobile network 75.

In order to store the image information supplied from the mobile network 75 into the network apparatus 74, first the message for transmitting the image information is transmitted from the mobile network 75. This message is processed by the mobile interface means 76, and then the protocol process of the message is carried out by the protocol processing means 77. A resultant response is transmitted to the mobile network 75 via the mobile interface means 76.

Then, the image information to be stored is extracted by processing the image information received via the mobile interface means 76 by using the protocol processing means 77. The extracted image information is processed by the image information edit processing means 78 to correspond to the mobile terminal which requests the reading, and is written into the storage unit 79 via the storage unit controlling means 80.

In response to the request issued from the mobile network 75 to read the image information, the mobile interface means 76 processes the information supplied from the mobile network 75 and then, when the protocol processing means 77 decides the request for reading the image information, it instructs the mobile interface means 76 to read the image information. Then, the mobile interface means 76 instructs the storage unit controlling means 80 to read the designated image information from the storage unit 79. Then, the storage unit controlling means 80 transfers the read image information to the mobile interface means 76. Thus, the read image information is transmitted to the mobile network 75 via the mobile interface means 76.

(Embodiment 4)

Figure 11:
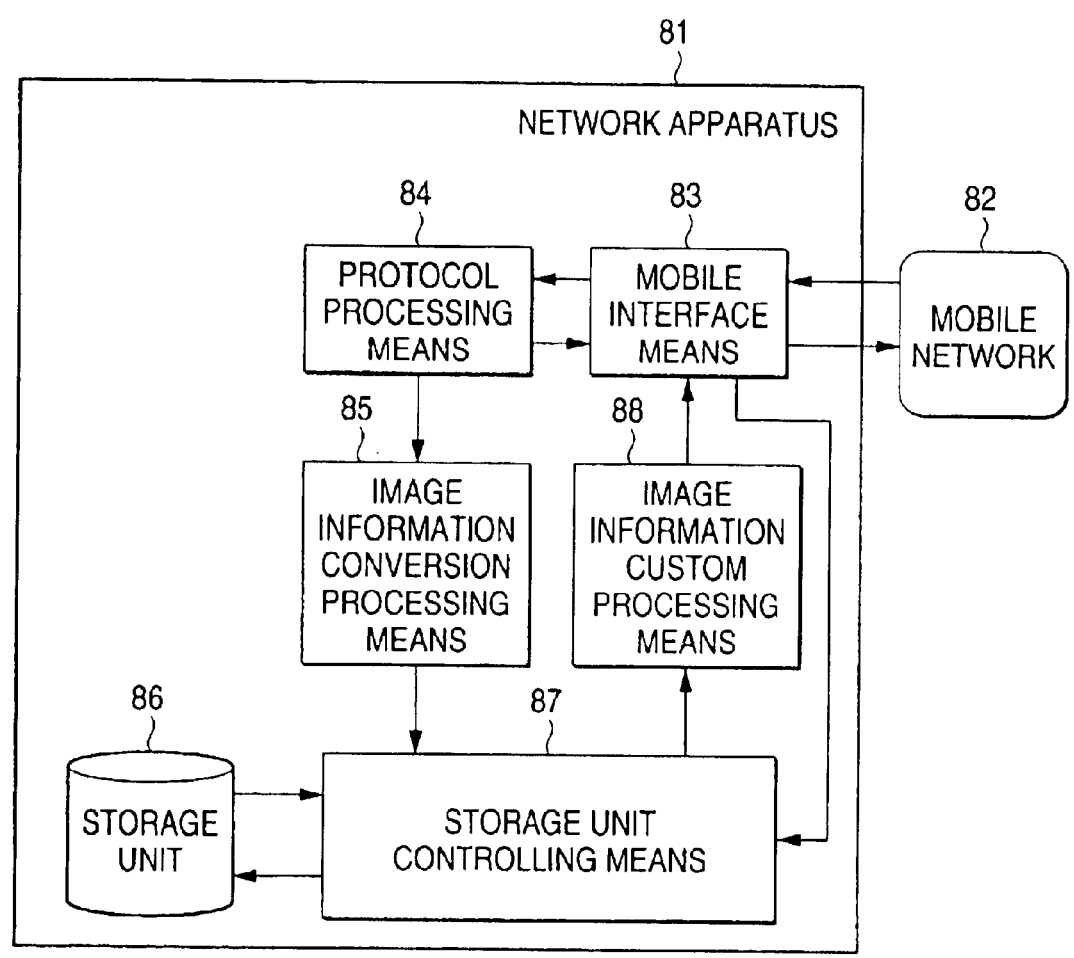
FIG. 11 is a block diagram showing a network apparatus according to an embodiment 4 of the present invention.

Next, a network apparatus 81, which achieves the communication of the image information between the mobile terminals in the mobile network, in an embodiment 4 of the present invention will be explained with reference to FIG. 11 hereinafter. Here a plurality of mobile networks may be employed. FIG. 11 is a block diagram showing the network apparatus 81 according to the embodiment 4 of the present invention.

In FIG. 11, a reference 81 denotes a network apparatus; 82, a mobile network; 83, a mobile interface means, which establishes an interface with the mobile network 82; 84, a protocol processing means, which executes the protocol process of the information being processed by the mobile interface means 83; 85, an image information conversion processing means, which converts image information formats, which is handled by different types of the mobile terminals respectively, into a common image format, which can be handled commonly by the mobile terminals; 86, a storage unit, which stores the image information supplied from the mobile terminals and converted by the image information conversion processing means 85; 87, a storage unit controlling means, which controls the writing/reading of the information from the mobile terminals into/from the storage unit 86; and 88, an image information custom processing means, which applies the custom process to the image information to correspond to the mobile terminal which has requested the reading of the image information in the common image format.

Next, an operation of the network apparatus 81 constructed as described above in the embodiment 4 of the present invention will be explained with reference to FIG. 11 hereinafter.

A feature of the network apparatus 81 in the embodiment 4 resides in that the image information used between the mobile terminals is communicated between the network apparatus 81 and the mobile network 82.

In order to store the image information supplied from the mobile network 82 into the network apparatus 81, first the message for transmitting the image information is transmitted from the mobile network 82. This message is processed by the mobile interface means 83, and then the protocol process of the message is carried out by the protocol processing means 84. A resultant response is transmitted to the mobile network 82 via the mobile interface means 83.

Then, the image information to be stored is extracted by processing the image information, which is received via the mobile interface means 83, by using the protocol processing means 84. The extracted image information is converted into the common image format into which various types of image information formats can be converted by the image information conversion processing means 85, and then is written into the storage unit 86 via the storage unit controlling means 87.

In response to the request issued from the mobile network 82 to read the image information, the mobile interface means 83 processes the information supplied from the mobile network 82 and then, when the protocol processing means 84 decides the request for reading the image information, it instructs the mobile interface means 83 to read the image information. Then, the mobile interface means 83 instructs the storage unit controlling means 87 to read the designated image information from the storage unit 86. Then, the storage unit controlling means 87 transfers the read image information to the image information custom processing means 88. Then, the read image information is custom-processed into the image information format, which is suited for the mobile terminal requesting the reading of the image information, by the image information custom processing means 88. Then, the processed image information is transmitted to the mobile network 82 via the mobile interface means 83.

(Embodiment 5)

Figure 12:
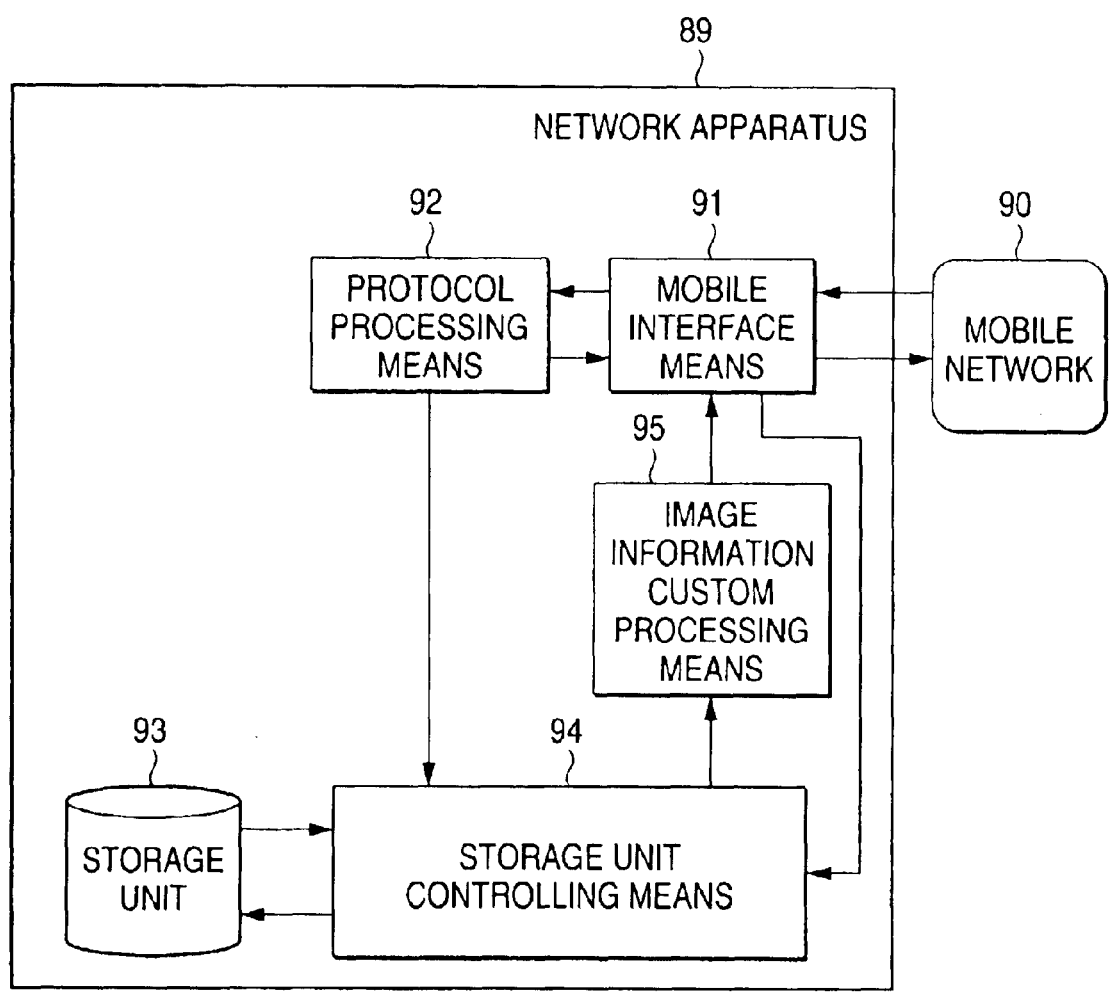
FIG. 12 is a block diagram showing a network apparatus according to an embodiment 5 of the present invention.

Next, a network apparatus 89, which achieves the broadcast of the continuous reproduction of the image information to the mobile network, in an embodiment 5 of the present invention will be explained with reference to FIG. 12 hereinafter. Here a plurality of mobile networks may be employed. FIG. 12 is a block diagram showing the network apparatus 89 according to the embodiment 5 of the present invention.

In FIG. 12, a reference 89 denotes a network apparatus; 90, a mobile network; 91, a mobile interface means, which establishes an interface with the mobile network 90; 92, a protocol processing means, which executes the protocol process of the information being processed by the mobile interface means 91; and 93, a storage unit. The image information which is converted into the common image format, which is employed to handle commonly the process formats of plural types of the image information is stored in the storage unit 93. In addition, a reference 94 denotes a storage unit controlling means, which controls the writing/reading of the information supplied from the mobile terminals into/from the storage unit 93; and 95, an image information custom processing means, which applies the custom process to the image information to correspond to the mobile terminal which has requested the reading of the image information in the common image format.

Next, an operation of the network apparatus 89 constructed as described above in the embodiment 5 of the present invention will be explained with reference to FIG. 12 hereinafter.

A feature of the network apparatus 89 in the embodiment 5 resides in that the image information is continuously reproduced and broadcasted to the mobile network 90.

A request message issued from the mobile network 90 to request the broadcast of the image information is processed by the network apparatus 89. Then, the network apparatus 89 transmits the information to the mobile network 90. Depending upon the service content, the information can always be transmitted as the broadcast without the request message.

The message issued from the mobile network 90 is subjected to the reception process by the mobile interface means 91 and then is subjected to the protocol process by the protocol processing means 92. As the result of this, the mobile interface means 91 returns the message concerning to the broadcast to the mobile network 90, and also instructs the storage unit controlling means 94 to read the broadcast information from the storage unit 93. After the broadcast has been commenced at that time, the mobile interface means 91 instructs the storage unit controlling means 94 of the timing to read the broadcast information from the storage unit 93 to thus fetch the image information. The fetched image information is custom-processed into the image information suitable for the mobile terminal by the image information custom processing means 95, so that the broadcast of the continuous reproduction of the image information can be implemented.

(Embodiment 6)

Figure 13:
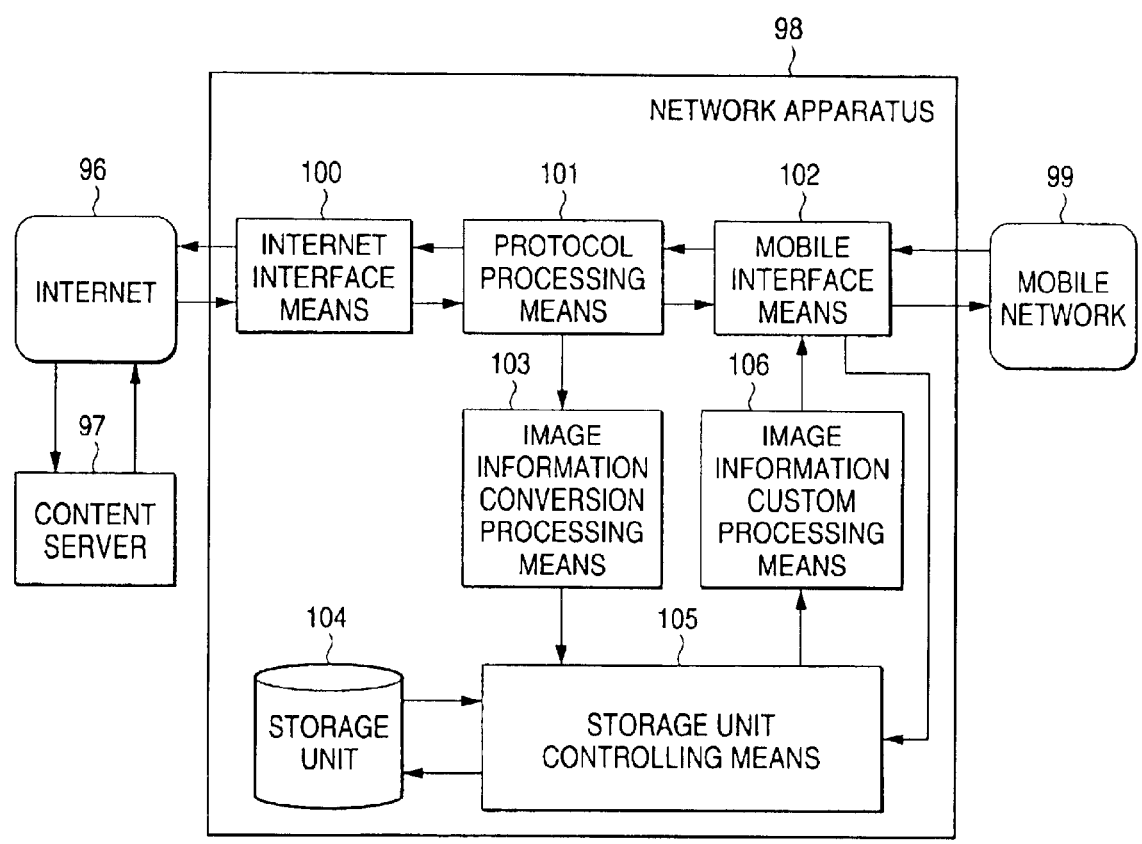
FIG. 13 is a block diagram showing a network apparatus according to an embodiment 6 of the present invention.

Next, a network apparatus 98 according to an embodiment 6 of the present invention, which can achieve the continuous reproduction of the image information to the mobile network, will be explained with reference to FIG. 13 hereinafter. Here a plurality of mobile networks may be employed. FIG. 13 is a block diagram showing the network apparatus 98 according to the embodiment 6 of the present invention.

In FIG. 13, a reference 96 denotes the Internet; 97, a content server for providing moving picture information or still picture information as contents; 98, a network apparatus; and 99, a mobile network. The network apparatus 98 handles an interface between the Internet 96 and the mobile network 99. In addition, a reference 100 denotes an Internet interface means, which establishes an interface with the Internet 96; and 101, a protocol processing means, which executes the protocol processes between the Internet 96 and the mobile network 99.

Also, a reference 102 denotes a mobile interface means, which establishes an interface with the mobile network 99; 103, an image information conversion processing means, which converts image information formats, which is handled by different types of the mobile terminals respectively, into a common image format, which can be handled commonly by the mobile terminals; and 104, a storage unit.

The image information being supplied from the mobile terminals and converted by the image information conversion processing means 103 is stored in the storage unit 104. A reference 105 denotes a storage unit controlling means, which controls the writing/reading of the information from the mobile terminals into/from the storage unit 104; and 106, an image information custom processing means, which executes the custom process to change the image information read from the storage unit 104 into the image information which correspond to the mobile terminal requesting the reading of the image information in the common image format.

Next, an operation of the network apparatus 98 constructed as described above in the embodiment 6 of the present invention will be explained with reference to FIG. 13 hereinafter.

A feature of the network apparatus 98 in the embodiment 6 is that the image information for the mobile network 99 can be reproduced continuously.

A message issued from the mobile network 99 to request the image information is processed by the network apparatus 98 and then supplied to the content server 97. More particularly, the message information which is interfaced by the mobile interface means 102 is protocol-processed by the protocol processing means 101, and then is supplied from the Internet interface means 100 to the content server 97 via the Internet 96. The content server 97 transmits the image information in response to this message. When the image information is supplied to the Internet interface means 100 via the Internet 96, the necessary image information is extracted by the protocol processing means 101, and then converted into the image information in the common image information format by the image information conversion processing means 103. The storage unit controlling means 105 stores the converted image information in the storage unit 104.

When the protocol processing means 101 analyzes that the transfer of the image information supplied from the content server 97 has been completed, it informs the mobile interface means 102 of such completion and then starts the communication with the mobile network 99 to achieve the continuous reproduction of the image information. The mobile interface means 102 instructs the storage unit controlling means of the reading timing at which the image information can be transmitted continuously every unit time. The storage unit controlling means transfers the edited image information from the storage unit 104 to the image information custom processing means 106 in answer to the instructed timing. The image information custom processing means 106 custom-processes the image information being transferred from the storage unit 104 into the image information format required to reproduce the image information by the mobile terminal, and then executes the transfer of the image information to the mobile network 99 via the mobile interface means 102 while maintaining the continuous reproduction.

The present invention can be constructed as described above for the image information from the Internet, especially to provide the image editing function corresponding to the mobile terminal, the storage unit for storing the edited information, and the controlling function for reading the edited information from the storage unit so as to allow the continuous reproduction of the image information by the mobile terminal in the network apparatus. Therefore, the image information can be continuously reproduced in the mobile terminal without the provision of the high performance CPU and the large capacity memory in the mobile terminal.

The present invention can be constructed as described above, especially to extract the image information from the information supplied from the Internet, then edit the extracted image information to meet with the mobile communication, then store the edited image information in the storage unit, and then inform the storage unit controlling means continuously every unit time of the timing instruction to read the stored information so as to allow the continuous reproduction of the image information. Therefore, the image information can be continuously reproduced in the mobile network.

The present invention can be constructed as described above, especially to process the image information in the interface located between the processing means by converting them into the cell format such as ATM. Therefore, it is possible to achieve a higher speed transmission in processing the information and a large capacity of switching capability, both of which are required to deal with a large quantity of image information such as with the network apparatus and to communicate the image information between a large number of mobile terminals.

The present invention can be constructed as described above, especially to distinguish the communication information into the image information necessary for the continuous reproduction of the moving picture information and the communication information, then handle the image information as the preferential information and the communication information as the non-preferential information so as to achieve the continuous reproduction of the image information, then transmit the non-preferential information between transmissions of the preferential information, whereby the preferential information can be transmitted preferentially to the mobile network. Therefore, the continuous reproduction of the image information can be accomplished.

The present invention can be constructed as described above, especially to read the information being stored in the storage unit in compliance with the reading timing instructed by the mobile interface means. Therefore, the broadcasting function by which the information can always be kept to send to the mobile network can be achieved.

The present invention can be constructed as described above, especially to edit the image information, which is supplied from the mobile terminal, into the edited information, which are suitable for the different types of mobile terminals, by the image information edit processing means, then to store the edited information in the storage unit, and then to transmit the edited information to other mobile terminals, such as when the image information is communicated from the Internet. Therefore, the communication of the image information between the mobile terminals can be achieved.

The present invention can be constructed as described above, especially to convert the image information into the image information in the common image information format, then to store it in the storage unit, and then to convert the stored image information in the common image information format into the image information in each format for each respective terminal when the image information is transmitted to the mobile network. Therefore, the image information being stored once can be utilized again because it is not affected by the image information format in the network, and thus it can be achieved as the communicating function between the mobile terminals and the broadcasting function.

The present invention can be constructed as described above, especially to convert the image information in the common image information format from the storage unit into the image information in each format handled by each terminal by the image information custom processing means when the image information is transmitted to the mobile network. Therefore, the broadcasting function can be achieved.

The present invention can be constructed as described above and especially there can be provided the network apparatus and the network communication method, which can reuse the image information being stored once in the storage unit by converting the image information into the common image information format by the image information conversion processing means and then storing the converted image information in the storage unit since the image information is not affected by the image information format in the network, and also can achieve the communicating function between the mobile terminals and the broadcasting function by converting the image information stored in the storage unit in the common image information format into the image information in the formats being handled by respective terminals by the image information custom processing means when the image information is transmitted to the mobile network, and also can achieve continuous reproduction of the image information for the mobile network since the mobile interface means can inform the storage unit controlling means of the reading timing instruction for the stored edited information continuously every unit time to allow the continuous reproduction of the image information.

What is claimed is:

1. A network apparatus for communicating multi-media information by mobile terminals, comprising:
   an Internet interface means for establishing an interface with the Internet;
   a mobile interface means for establishing an interface with a mobile network;
   a protocol processing means for applying a protocol process to information which is processed by the Internet interface means and the mobile interface means;
   an image information edit processing means for editing a display characteristic of image information which is extracted by the protocol processing means into image information suitable for a mobile communication with a mobile terminal by thinning the image information, said display characteristic being at least one of a screen size of the image information and a color depth of the image information;
   a storage unit for storing the image information which is edited by the image information edit processing means;
   a storage unit controlling means for controlling to store the image information in the storage unit and to read the stored image information; and
   a transmission timing control processing means for informing the storage unit controlling means of a transmission timing so as to transmit the image information continuously every unit time.

2. A network apparatus according to claim 1, wherein the image information which is transmitted/received in respective interfaces of said Internet interface means, said mobile interface means, said protocol processing means, said image information edit processing means, and said storage unit controlling means is communicated in a cellulated format.

3. A network apparatus according to claim 1, wherein said mobile interface means includes:
   a mobile protocol reception processing means for receiving information from the mobile network and then informing the protocol processing means; and
   a mobile protocol transmission processing means for transmitting information from the protocol processing means and information from the storage unit controlling means to the mobile network via a transmission process.

4. A network apparatus according to claim 3, wherein said mobile protocol transmission processing means includes:
- an asynchronous information processing means for processing asynchronous communication information from the protocol processing means;
- a synchronous information processing means for processing synchronous image information form the storage unit controlling means;
- a transmission buffer for transmitting the information to the mobile network; and
- an information write controlling means for controlling to write the image information from the synchronous information processing means into the transmission buffer prior to communication information form the asynchronous information processing means,
- whereby the image information processed by the synchronous information processing means are transmitted to the mobile network prior to the communication information so as to allow continuous reproduction of the image information.

5. A network apparatus according to claim 1, wherein said Internet interface means includes:
- an Internet protocol reception processing means for performing a communication process of the information received from the Internet and then informing the protocol processing means; and
- an Internet protocol transmission processing means for transmitting the information received from the protocol processing means to the Internet.

6. A network apparatus according to claim 5, wherein said Internet interface means includes an interface for cellulating the information to communicate communication information and the image information when the Internet protocol reception processing means and the Internet protocol transmission processing means communicate with the protocol processing means.

7. A network apparatus according to claim 1, wherein said protocol processing means includes:
- an Internet protocol address analysis processing means for analyzing that the information from the Internet interface means correspond to either of communication information and the image information;
- an image information protocol processing means for executing a protocol process of the image information from the Internet protocol address analysis processing means;
- a data reproduction processing means for processing the image information which are protocol-processed by the image information protocol processing means to reproduce original information; and
- a communication network protocol processing means for protocol-processing the information supplied to the Internet and the mobile network.

8. A network apparatus according to claim 1, wherein said image information edit processing means includes:
- a reproduced data storage unit for storing the image information reproduced by the protocol processing means;
- a received data managing means for managing writing/reading of reproduced data into/from the reproduced data storage unit; and
- a reproduced data editing means for editing the reproduced data read from the reproduced data storage unit into a format which is suitable for the mobile terminal.

9. A network apparatus according to claim 1, wherein said storage unit controlling means includes:
- an edit data split processing means for splitting edited information edited by the image information edit processing means into cellulated information to write them into the storage unit;
- a storage unit managing means for managing reading process/writing process from/into the storage unit;
- a data storage processing means for instructing the storage unit managing means of writing of split data edited by the edit data split processing means; and
- a data read processing means for instructing the storage unit managing means of reading in response to a reading timing instruction issued from the mobile interface means.

10. A network apparatus for communicating image information between mobile terminals comprising:
- a mobile interface means for establishing an interface with a mobile network in communication with the mobile network;
- a protocol processing means for processing protocol of image information from one of the mobile terminals;
- an image information edit processing means for editing a display characteristic of the image information into edited information suitable for said one of the mobile terminals, said display characteristic being at least one of a screen size of the image information and a color depth of the image information;
- a storage unit for storing the edited information; and
- a storage unit controlling means for controlling to store the edited information into the storage unit and to read stored edited information.

11. A network apparatus comprising:
- a mobile interface means for establishing an interface with a mobile network in communication with the mobile network;
- a protocol processing means for processing protocol of image information from the mobile terminal;
- an image information conversion processing means for converting the image information into a common image information format;
- a storage unit for storing converted image information;
- a storage unit controlling means for controlling to store the image information into the storage unit and to read stored image information; and
- an image information custom processing means for editing a display characteristic of the image information read from the storage unit into the image information which is suitable for respective mobile terminals, said display characteristic being at least one of a screen size of the image information and a color depth of the image information;
- wherein the image information can be communicated between different types of mobile terminals.

12. A network apparatus comprising:
- a mobile interface means for establishing an interface with a mobile network in communication with the mobile network;
- a protocol processing means for processing protocol of image information from the mobile terminal;
- a storage unit for storing the image information in a common image information format;
- a storage unit controlling means for controlling to store the image information into the storage unit and to read stored image information; and an image information custom processing means for editing a display characteristic of the image information read from the storage unit into the image information which is suitable for respective mobile terminals, said display characteristic being at least one of a screen size of the image information and a color depth of the image information;

wherein the image information read from the storage unit are supplied constantly to the mobile network to deliver broadcast.

13. A network apparatus for communicating multi-media information by mobile terminals, comprising:

an Internet interface means for establishing an interface with the Internet;

a mobile interface means for establishing an interface with a mobile network;

a protocol processing means for processing protocol of information which is processed by the Internet interface means and the mobile interface means;

an image information conversion processing means for converting the image information extracted by the protocol processing means into a common image information format;

a storage unit for storing the image information converted by the image information conversion processing means;

a storage unit controlling means for controlling to store the image information into the storage unit and to read stored image information; and an image information custom processing means for editing and processing a display characteristic of the image information read by the storage unit controlling means to perform a mobile communication, said display characteristic being at least one of a screen size of the image information and a color depth of the image information.

14. A network communication method applied to a network apparatus in a network for communicating multi-media information by mobile terminals, comprising the steps of:

interface-processing information between the Internet and the network apparatus;

interface-processing information between a mobile network and the network apparatus;

protocol-processing the information which is interface-processed;

edit-processing a display characteristic of the image information which is extracted by protocol process to perform a mobile communication, said display characteristic being at least one of a screen size of the image information and a color depth of the image information;

storing the image information which is subjected to edit process; and controlling storing of the image information and reading of stored image information.

15. A network communication method according to claim 14, wherein the image information which is transmitted/received is communicated in a cellulated format in an interface with the Internet interface means, an interface with the mobile interface means, an interface when the information which is interface-processed is protocol-processed, an interface when the image information extracted via the protocol process is edit-processed, and an interface when the image information is stored and stored image information is read.

16. A network communication method according to claim 14, wherein the step of interface-processing the information between the mobile network and the network apparatus includes the steps of:

receiving the information from the mobile network and then informing the protocol processing means;

transmitting the information form the protocol precessing means and the information from the storage unit controlling means, which controls storage of the image information, via transmission process to the mobile network; and informing the storage unit controlling means, which controls storage and reading of the image information, of a transmission timing so as to transmit the image information continuously ever unit time, whereby continuous reproduction of the image information for the mobile network can be achieved based on such information of the transmission timing to the storage unit controlling means.

17. A network communication method according to claim 16, wherein the step of transmitting the information from the protocol processing means and the information from the storage unit controlling means which controls storage of the image information via transmission process to the mobile network, includes the steps of:

processing asynchronous communication information from the protocol processing means;

processing synchronous image information from the storage unit controlling means;

a transmission buffer for transmitting the information to the mobile network;

storing processed synchronous image information to be transmitted prior to processed asynchronous communication information; and transmitting the processed synchronous image information to the mobile network;

whereby the image information processed by the synchronous information processing means is transmitted to the mobile network prior to the communication information so as to allow continuous reproduction of the image information.

18. A network communication method according to claim 14, wherein the step of interface-processing between the Internet and the network apparatus, includes the steps of:

performing a communication process of the information received from the Internet and then informing the protocol processing means; and transmitting the information received from the protocol processing means to the Internet.

19. A network communication method according to claim 18, wherein the step of interface-processing between the Internet and the network apparatus, includes the steps of:

cellulating communication information and the image information which is communicated between the protocol processing means and the Internet, when the information received from the Internet is communicated and transmitted to the protocol processing means and also the information received from the protocol processing means is transmitted to the Internet.

20. A network communication method according to claim 14, wherein the step of protocol-processing the information being interface-processed, includes the steps of:

determining that the information which are interface-processed correspond to either of communication information and the image information to the mobile network;

protocol-processing analyzed image information;

processing the image information which is protocol-processed to reproduce original information; and protocol-processing the information supplied to the Internet and the mobile network.

21. A network communication method according to claim 14, wherein the step of edit-processing the image information which is extracted by protocol process to perform a mobile communication, includes the steps of:

storing the image information reproduced by the protocol processing means;

managing writing/reading of reproduced image information; and editing read reproduced data into a format which is suitable for mobile communication.

22. A network communication method according to claim 14, wherein the step of controlling storing of the image information and reading of stored image information, includes the steps of:

splitting edited data which is obtained by editing the image information extracted by the protocol process to perform the mobile communication so as to store the edited data;

processing storing and reading of edited data by the storage unit managing means;

instructing the storage unit managing means to write edited split data; and instructing the storage unit managing means of reading in response to a reading timing instruction issued from the mobile interface means.

23. A network communication method in communication with a mobile network, comprising the steps of:

interface-processing information between a network apparatus and the mobile network;

protocol-processing information which is supplied from the mobile terminal and interface-processed;

editing a display characteristic of the image information being protocol-processed into edited information suitable for the mobile terminal, said display characteristic being at least one of a screen size of the image information and a color depth of the image information;

storing the edited information; and controlling storing and reading of the edited information;

wherein the image information is communicated between the mobile terminals.

24. A network communication method in communication with a mobile network, comprising the steps of:

interface-processing information between a network apparatus and the mobile network;

protocol-processing information which is supplied from the mobile terminal and interface-processed;

converting plural types of image information formats into a common image information format;

storing converted image information; and reading stored image information and then editing a display characteristic of the image information into the image information which is suitable for plural types of mobile terminals, said display characteristic being at least one of a screen size of the image information and a color depth of the image information;

wherein the image information can be communicated between different types of mobile terminals.

25. A network communication method in communication with a mobile network, comprising the steps of:

interface-processing information between a network apparatus and the mobile network;

protocol-processing information which is supplied from the mobile terminal and interface-processed;

providing a reading instruction and a reading timing to read stored image information in a common image information format;

editing a display characteristic of read image information into the image information which is suitable for respective mobile terminals, said display characteristic being at least one of a screen size of the image information and a color depth of the image information; and broadcasting edited image information by supplying the edited information constantly to the mobile network.

26. A network communication method applied to a network apparatus in a network for communicating multimedia information by mobile terminals, comprising the steps of:

interface-processing information between the Internet and the network apparatus;

interface-processing information between a mobile network and the network apparatus;

protocol-processing the information which is interface-processed;

converting the image information extracted by the protocol process into a common image information format;

storing the image information which is converted into the common image information format; and reading stored image information and then custom-processing a display characteristic of the stored image information, said display characteristic being at least one of a screen size of the image information and a color depth of the image information.

* * * * *